United States Patent [19]

Tomoda et al.

[11] Patent Number: 5,008,872
[45] Date of Patent: Apr. 16, 1991

[54] OPTICAL DISC REPRODUCTION APPARATUS WHICH DETECTS MAXIMUM AUDIO SIGNAL LEVEL RECORDED ON AN OPTICAL DISK

[75] Inventors: Haruhisa Tomoda, Neyagawa; Yasuomi Shimada, Katano, both of Japan

[73] Assignee: Matsushita Electric Industrial Co., Ltd., Osaka, Japan

[21] Appl. No.: 171,471

[22] Filed: Mar. 21, 1988

[30] Foreign Application Priority Data

Mar. 20, 1987 [JP] Japan .................... 62-66431

[51] Int. Cl.[5] ...................... G11B 21/10; G11B 21/12
[52] U.S. Cl. ........................... 369/32; 360/6;
369/50; 369/58; 369/134
[58] Field of Search ................. 369/32, 33, 53, 54,
369/58, 47, 50, 124, 128, 134, 174; 358/342;
360/5, 6

[56] References Cited

U.S. PATENT DOCUMENTS 4,855,978  8/1989  Kanamaru .................... 369/50 X

Primary Examiner—Aristotelis M. Psitos
Assistant Examiner—W. R. Young
Attorney, Agent, or Firm—Wenderoth, Lind & Ponack

[57] ABSTRACT

An optical disc reproduction apparatus is disclosed including a device for detecting a maximum audio signal level recorded on the optical disc. A first course-search is effected of the entire optical disc to detect a first location on the optical disc in which a maximum value of a recorded audio signal is located. A second fine-search of the optical disc is effected within a region extending in opposite directions from the location on the optical disc detected during the first course-search. During the second fine-search operation, a second location on the optical disc is located in which a maximum value of the recorded audio signal level is located. Then, audio signals are reproduced repetitiously in the vicinity of the second location detected during the second fine-search operation.

14 Claims, 5 Drawing Sheets

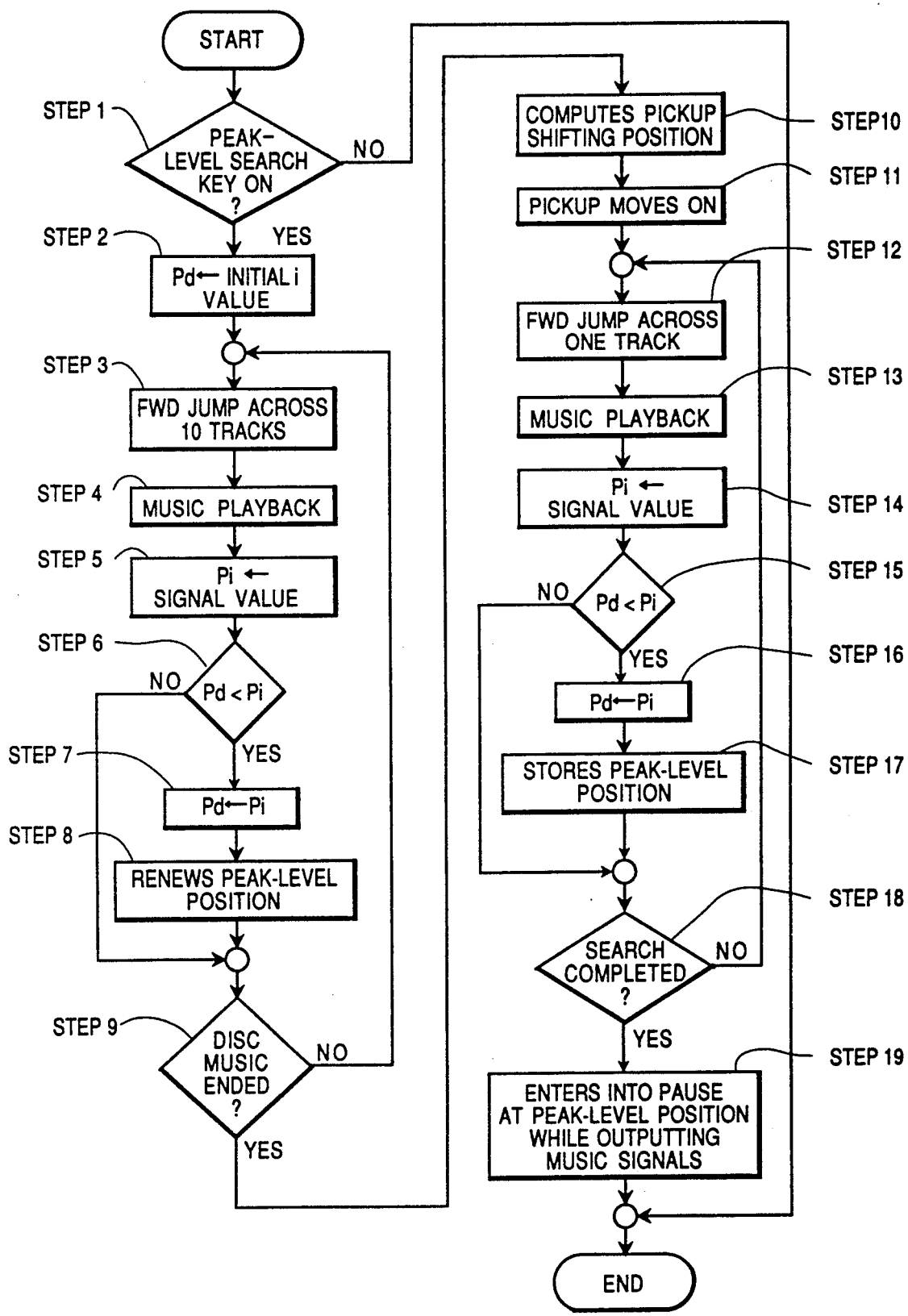

OPTICAL DISC REPRODUCTION APPARATUS WHICH DETECTS MAXIMUM AUDIO SIGNAL LEVEL RECORDED ON AN OPTICAL DISK

BACKGROUND OF THE INVENTION

1. Field of the Invention

The present invention relates to an optical disc reproduction apparatus, such as a compact disc player.

More particularly, the present invention relates to an optical disc player capable of detecting the peak audio level of signals recorded on an optical disc.

2. Description of the Related Art

The conventional optical disc player is typically configured as shown in FIGS. 6 through 8. A signal detector 1 includes an optical pickup for reading music information and music-playing time information recorded on an optical disc (hereinafter referred to simply as a disc). A signal output device 2 processes the music information read by the signal detector 1, and then converts the music information into audio signals before eventually outputting the audio signals. A controller 3 controls both the signal detector 1 and the signal output device 2. A display unit 4 displays information, such as the music-playing time information read by the signal detector 1. A key-switch assembly unit 5 includes at least a music play key 5a, a forward search key 5b, and a reverse search key 5c, and instructs the controller 3 to begin playing of the music, to begin a fast-forwarding operation, and to being any other operation of the optical pickup by causing the optical pick up to jump over tracks of the disc.

Typically, the conventional optical disc player executes control operations as shown in the flowchart of FIG. 8 in accordance with the configuration described above. The controller 3 determines at step 1 whether or not the play key 5a is depressed. If the pay key 5a is depressed then step 2 is effected. If the play key 5a is not depressed, the routine process is terminated. At step 2, the display unit displays music-playing time information read by the signal detector 1, and the signal output device 2 outputs audio signals to cause the disc player to play music recorded on the disc. At step 3, the controller 3 determines whether or not search keys 5a and 5c are depressed. If neither of these keys were depressed, then step 5 is effected. At step 4, the controller 3 causes the optical pickup to jump across tracks in a direction towards the outer circumference or the inner circumference of the disc. At step 5, the controller 3 determines whether or not the optical pick up has reached the end of the music signals recorded on the disc. If the optical pickup is at the end of the recorded music signals, the routine process returns to step 2, causing the disc player to sequentially repeat step 2 through 5 until the optical pickup eventually reaches the end of music signals recorded on the disc.

The conventional optical disc players having the above configuration require the execution of extremely complex processes to determine the recording input level when recording music signals recorded on the disc using a magnetic recording apparatus. Specifically, in order to properly determine the recording input level of the magnetic recording apparatus, it is necessary to detect the highest audio level of music signals recorded on the disc (hereinafter referred to simply the peak level). To detect the peak level, conventionally, the operator causes the optical pickup to fast forward by depressing a search key while the disc player simultaneously plays back music, and then, the operator detects the peak level by either listening to the music or by watching the level of a meter. Accordingly, music signals are transmitted to the magnetic recording apparatus before the operator can eventually adjust the recording input level, thereby requiring replaying of the detected portion. This in turn requires the operator to execute extremely inconvenient operations.

BRIEF SUMMARY OF THE INVENTION

The object of the present invention is to overcome the above and other problems by providing a novel optical disc reproduction apparatus which automatically detects the peak level and causes the peak-level music signal to pause at the peak level recorded position and repeatedly output the peak-level music signals.

To achieve the above and other objects, the optical disc reproduction apparatus of the present invention includes: a signal detector for detecting music-playing time information and music signals recorded on the optical disc; a signal output device for outputting the signals detected by the signal detector; a signal-level input unit for inputting music signal levels; a peak level memory for storing peak levels of music signals; a peak-level position memory for storing the position at which the peak-level signal is recorded; a comparison unit for comparing the peak level stored in the peak-level memory and the signal level input via the signal-level input unit; a renewal unit for resetting the value of the peak-level memory and the value of the peak-level position memory in accordance with the result of comparison executed by comparison unit; a reference value memory for storing predetermined reference values; a peak-level-detecting operation unit for computing a peak-level fine-search starting position and the peak-level fine-search completing position from the reference values stored in the reference value memory and the peak-level positions stored in the peak-level position memory, and for detecting a more accurate peak level position by activating the peak-level fine-search mode, and for computing the peak-level pause position from the peak-level position detected during the peak-level fine-search mode and from the reference values stored in the reference value memory; a fine-search starting position memory for storing the values computed by the peak-level-detecting operation unit; a fine-search completing position memory; and a pause position memory.

The optical disc reproduction apparatus of the present invention features the above configuration and provides extremely advantageous functions which are summarized below.

While causing the optical pickup to jump across a certain number of tracks, the optical disc recording apparatus of the present invention continuously receives music signal levels recorded on the disc, and at the same time, it compares the input signal level to the preceding signal levels stored in memory, and then stores the signal having the greater value in a memory. Then, the optical disc reproduction apparatus again causes the optical pickup to jump across a certain number of tracks to repeatedly compare the stored signal levels to the newly input signal level before automatically detecting the exact position at which the peak level is recorded. The apparatus of the present invention then enters into pause condition while simultaneously activating the signal output device to output music signals at the peak-level detected position. As a result, the operator can easily and precisely adjust the recording input level of the magnetic recording apparatus as required.

BRIEF DESCRIPTION OF THE DRAWINGS

FIG. 4 is the operational flowchart denoting the routine processes for automatically detecting the peak level of input music signals;

DETAILED DESCRIPTION OF THE PREFERRED EMBODIMENT

Referring now to FIGS. 1 through 5, a preferred embodiment of the optical disc reproduction apparatus according to the present invention is described below.

Figure 1:
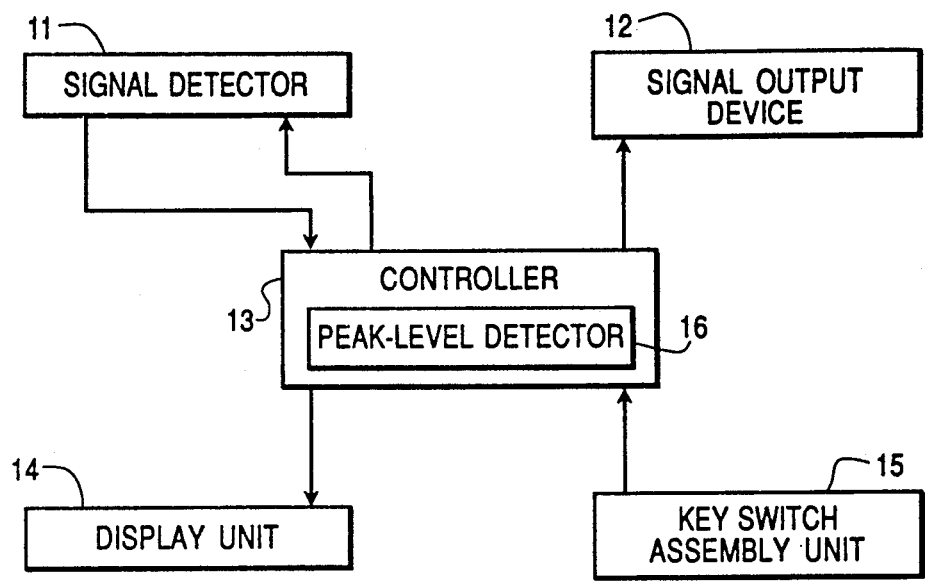
FIG. 1 is the simplified schematic block diagram of a preferred embodiment of the optical disc reproduction apparatus of the present invention.
Figure 2:
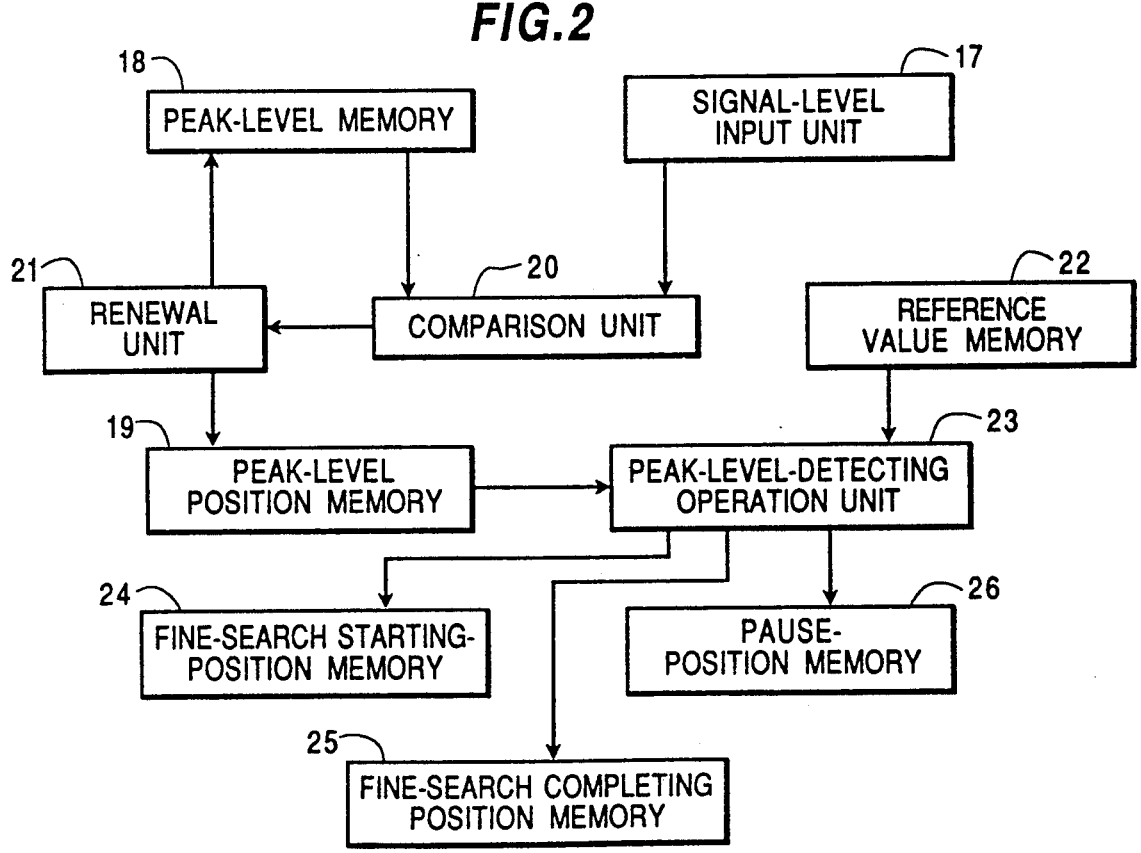
FIG. 2 is the simplified schematic block diagram of the peak-level detector 16 shown in FIG. 1.

As shown in FIG. 1, the reproduction apparatus of the present invention includes: a signal detector 11 and signal output device 12 each having operating functions identical to those of the conventional signal detector and signal output device; a controller 13 for controlling the signal detector 11 and the signal output device 12 and including the peak-level detector 16 described below; a display unit 14 for visually displaying information such as music-playing time information and other information; and a key switch assembly unit 15 including at least a peak-level search key 15a (see FIG. 3) for instructing the controller 13 to automatically detect the peak level of the input music signals.

The peak-level detector 16 substantially includes: a signal level input unit 17 for transmitting the music signal levels recorded on the disc which are detected by the signal detector 11; a peak level memory 18 for storing the peak value of the signal levels received from the signal level input unit 17; a peak-level position memory 19 for storing the specific disc position at which the peak level is recorded; a comparison unit for comparing a new signal level received from the signal level input unit 17 with a preceding peak value stored in the peak level memory 18; a renewal unit 21 for resetting the values of the peak level memory 18 and the peak-level position memory 19 when the newly input signal level is determined by the comparison unit 20 to be higher than the preceding peak levels stored in memories 18 and 19; a reference value memory 22 for storing predetermined reference values "a" through "c"; a peak-level-detecting operation unit 23 for computing the values required for detecting the peak level based on the values which are stored in the peak-level position memory 19 and the reference values stored in the reference value memory 22; a fine-search starting position memory 24 for storing a peak-level fine-search starting position computed by the peak-level-detecting operation unit 23 according to a subtraction of the reference value "a" from the value of the peak-level position memory 19 stored during an activated peak-level coarse-search mode; a fine-search completing position memory 25 for storing a peak-level fine-search completing position generated according to an addition of the reference value "b"; and a pause position memory 26 for storing a peak-level pause position generated according to an addition of the reference value "c" and the value of the peak-level position memory 19 stored during the activated peak-level fine-search mode, respectively.

Referring now to the operational flowchart shown in FIG. 4, functional operations of the optical disc reproduction apparatus of the above configuration are described below.

First, at step 1, the controller 3 determines whether or not the peak-level search key 15a is depressed. If key 15a is depressed, then step 2 is effected. If key 15a is not depressed, then the process routine is terminated. At step 2, the controller 13 causes an initial value to be stored in the peak-level memory 18 (the value stored in the peak-level memory memory 18 is hereinafter denoted Pd). Next, at step 3, the controller 13 causes the optical pickup to automatically jump across 10 tracks of the disc in a direction towards the outer circumference of the disc. At step 4, the signal detector 11 detects music signals recorded at the position at which the optical pickup has just landed, thus causing the signal output device 12 to output the detected music signals. Next, at step 5, the music signal level of the music signals output at step 4 is detected and input to the controller 13 and denoted Pi. At step 6, the comparison unit 20 executes a comparison between Pd and Pi, and if the value of Pi is higher than that of Pd, then step 7 is effected. If the value Pi is not higher than that of Pd, then step 9 is effected. At step 7, the renewal means 21 resets the value Pd stored in the peak level memory 18 to the value Pi which was delivered to the controller 13 at step 5. Likewise, at step 8, the renewal means 21 also resets the value stored in the peak-level position memory 24 to the recording position at which the music signal of a specific level was detected at step 5. Next, at step 9, the controller 13 determines whether or not the optical pickup has reached the end of music signals recorded on the disc. If the optical pickup has reached the end of music signals, then step 10 is effected. If the optical pick has not yet reached the end of music signal, then the routine process returns to step 3. Steps 3 through 9 are repeated until the optical pickup eventually reaches the end of music signals recorded on the disc. These steps 3 through 9 constitute the peak-level coarse-search mode, in which the system roughly detects the peak levels of music signals throughout the entire track of the disc.

Figure 5B:
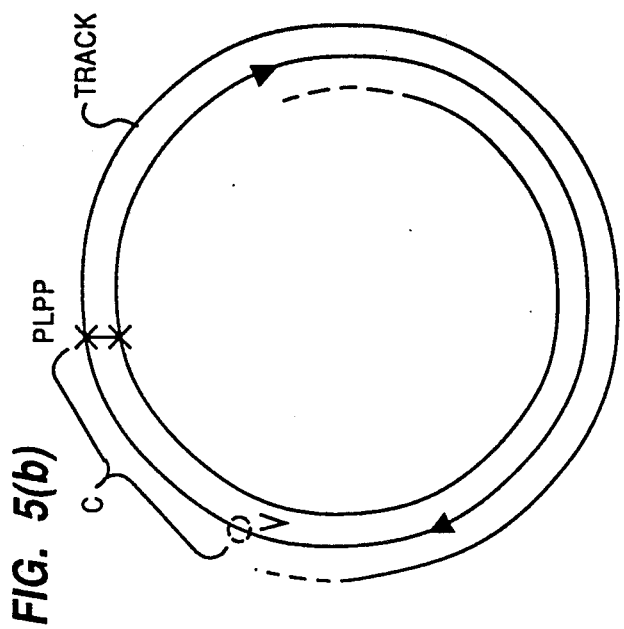
FIGS. 5(a) and 5(b) are views for explaining the fine-search mode and the pause condition, respectively.
Figure 5A:
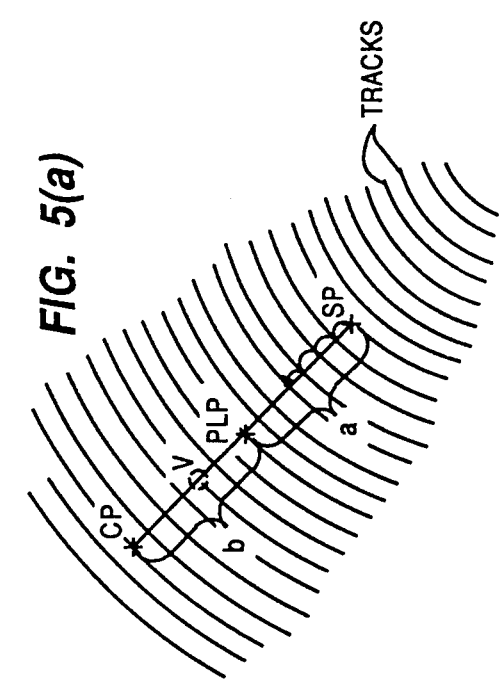
Figure 3:
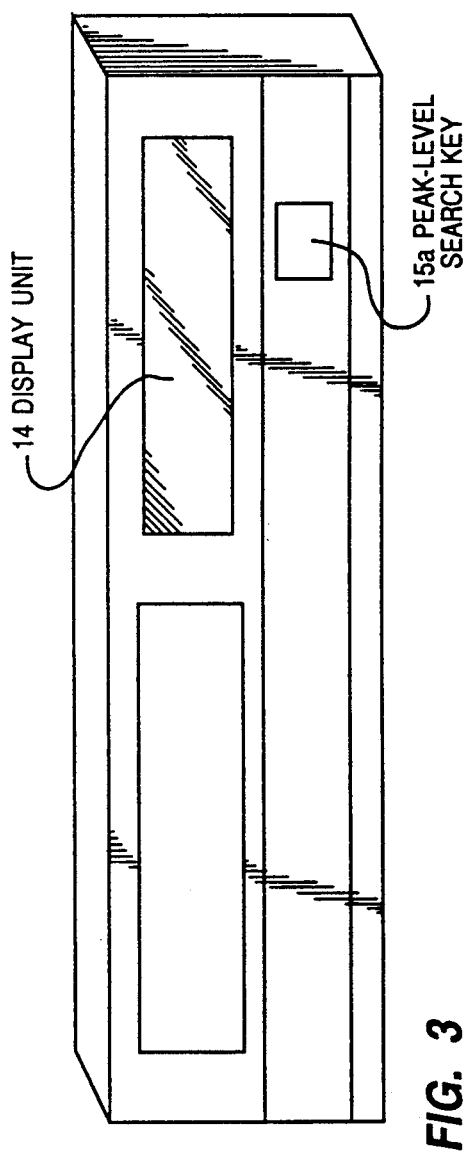
FIG. 3 is the simplified external view of the optical disc reproduction apparatus of the present invention.
Figure 6:
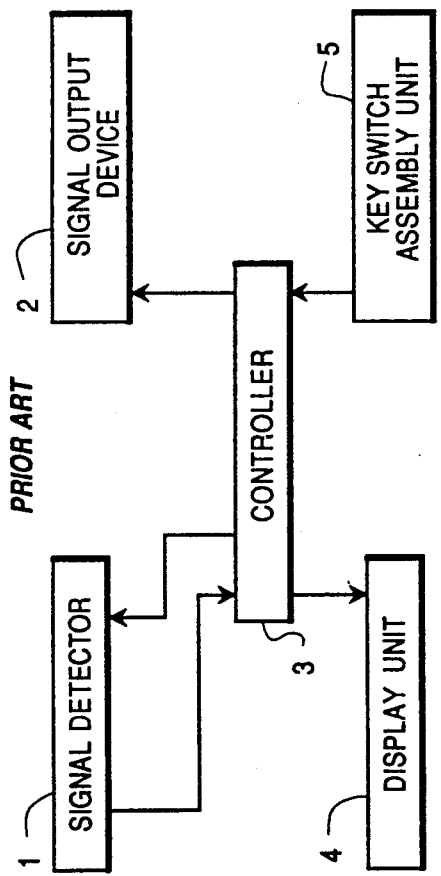
FIG. 6 is the simplified schematic block diagram of a conventional optical disc reproduction apparatus.
Figure 7:
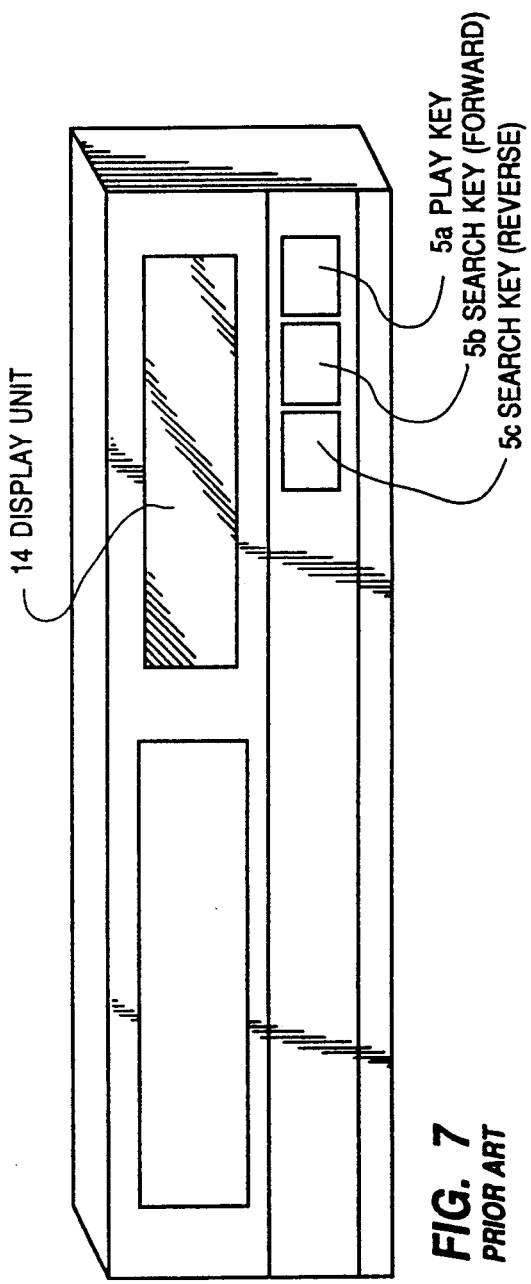
FIG. 7 is the simplified external view of the conventional optical disc reproduction apparatus shown in FIG. 6.
Figure 8:
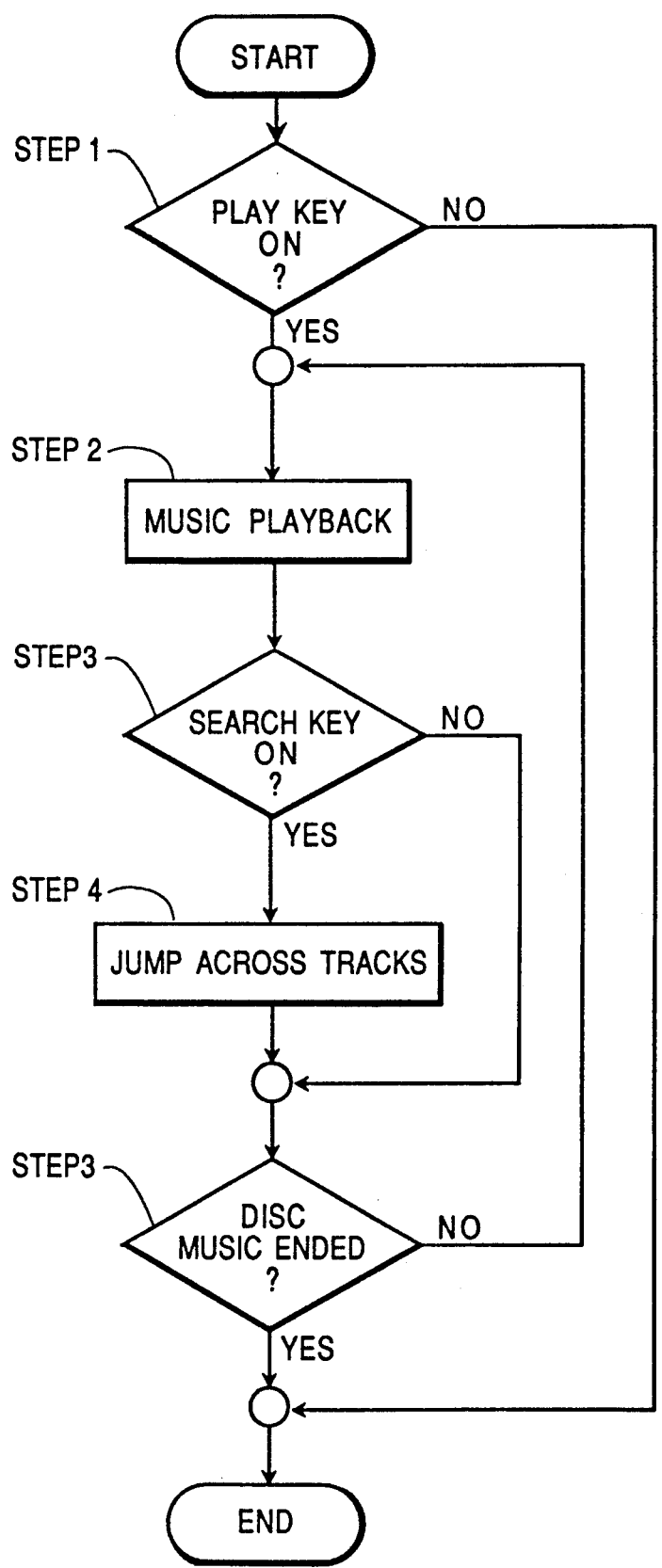
FIG. 8 is the operational flowchart denoting the routine processes executed by the conventional optical disc reproduction apparatus shown in FIGS. 6 and 7.

Next, at step 10, in order to precisely search the peak levels of the music signals recorded on the disc, the peak-level-detecting operation unit 23 subtracts the reference value "a" from the peak-level position (PLP) stored during the peak-level coarse-search mode so that the peak-level fine-search starting position (SP) can be determined, and then stores the determined position (SP) in the fine-search starting position memory 24 (See FIG. 5(a)). The peak-level-detecting operation unit 23 then adds the reference value "b" to the peak-level position (PLP) to determine the peak-level fine-search completing position (CP), which is then stored in the peak-level fine-search completing position memory 25. Though the reference values "a" and "b" are shown as track numbers in FIG. 5(a), the reference values "a"

and "b" can instead represent a time period corresponding to certain music-playing time information of the track. At step 11, the controller 13 then causes the optical pickup to move to the position stored in the fine-search starting position memory 24. Next, at step 12, the controller 13 causes the optical pickup to automatically jump across one track of the disc in a direction towards the outer circumference of the disc. The optical disc reproduction apparatus then executes the process operations of steps 13 through 17. Since these process operations are identical to those which are executed at steps 4 through 8, an explanation of step 13 through 17 is omitted. Next, at step 18, the controller 13 determines whether or not the optical pickup has reached the position stored in the peak-level fine-search completing position memory 25. If the optical pickup has reached the designated position, then step 19 is effected. If the optical pickup has not yet reached at the designated position, then the routine process returns to step 12, and steps 12 through 18 are repeated until the optical pickup eventually reaches the fine-search completing position. These steps 12 through 18 together constitute the peak-level fine-search mode. Consequently, the optical disc reproduction apparatus of the present invention assuredly and accurately detects a peak-level position by repeatedly conducting a fine-searching operation of the regions in close proximity to the recording position at which the peak-level signal is obtained during the peak-level coarse search mode. At step 19, the peak-level pause position (PLPP) is determined by adding the reference value "c" to the value (v) of the peak-level position memory 19 stored during the peak-level fine-search mode, and then, the peak-level pause position is stored in the pause-position memory 26. The controller 13, then causes the optical pickup to move to the position (PLPP) stored in the pause-position memory 26 so that the optical pickup can enter into a pause condition to complete the operating routine.

In the pause condition, as shown in FIG. 5(b), the controller 13 causes the optical pickup to automatically jump across one track in a direction towards the inner circumference of the disc, and then causes the signal output device 12 to output music signals detected by the signal detector 11 from the position at which the optical pickup has landed. Then, as soon as the optical pickup reaches the position (PLPP) stored in the pause-position memory 26, the controller 13 again causes the optical pickup to automatically jump across one track in a direction towards the inner circumference of the disc. While these sequential routine processes are executed, audible music signals are continuously output.

In the above preferred embodiment, the pause condition persists for a period of time during which the optical pickup repeatedly jumps across one track in the direction towards the inner circumference of the disc upon reaching the position (PLPP). However, the above preferred embodiment also provides for the optical disc reproduction apparatus of the present invention to repeatedly play back music during a specified period of time corresponding to m-seconds before and after the arrival of the optical pickup at the peak-level position by allowing the optical pickup to jump across n-pieces (wherein n is optional) of track.

According to the above preferred embodiment, when an operator adjusts the recording input level of a magnetic recording apparatus for recording music signals from an optical disc, the operator must merely depress a peak-level search key of the optical disc reproduction apparatus. The optical disc reproduction apparatus of the present invention repeatedly executes operations including comparing a newly input signal level of the disc with a preceding peak-level value and storing the greater signal level in memory, while causing the optical pickup to move in a direction towards the outer circumference of the disc. As a result, the optical disc reproduction apparatus of the present invention automatically detects a position at which the peak-level music signal is recorded on the disc, and then enters into pause condition at the peak-level position while continuously outputting music signals, thus allowing the operator to easily and precisely adjust the recording input level of the magnetic recording apparatus.

As is clear from the above description, the optical disc reproduction apparatus of the present invention includes: a signal detector for detecting music-playing time information and music signals recorded on an optical disc; a signal output device for outputting the signals detected by the signal detector; a signal-level input unit for inputting music signal levels; a peak-level memory for storing the peak level of music signals; a peak level position memory for storing the position at which the peak level signal is recorded; a comparison unit for comparing the signal level stored in the peak level memory with the signal level input by signal input unit; a renewal unit for resetting the value of the peak level memory and the value of the peak level position memory in accordance with the result of comparison executed by the comparison unit; a reference value memory for storing predetermined reference values; a peak-level-detecting operation unit for computing the peak-level fine-search starting position and the peak-level fine-search completing position, and for detecting a more accurate peak level position from the reference values stored in the reference value memory and the peak level position stored in the peak level position memory by activating peak level fine-search mode, and for computing the peak level pause position from the peak level position detected during the peak-level fine-search mode and from the reference values stored in the reference value memory; a fine-search starting position memory for storing the values computed by the peak-level-detecting operation unit; a fine-search completing position memory; and pause position memory.

When the operator adjusts the recording input level of the magnetic recording apparatus before recording music signals from an optical disc, the optical disc reproduction apparatus of the present invention automatically detects the peak level position and enters into a pause condition merely by depressing the peak-level search key, and as a result, the operator can very easily and precisely adjust the recording input level of the magnetic recording apparatus.

what is claimed is:

1. An optical disc reproduction apparatus for audibly reproducing signals recorded on an optical disc and for detecting a peak audio level of signals recorded on the optical disc, the optical disc having on a surface thereof a plurality of generally concentric recording tracks, said optical disc reproduction apparatus comprising:

a reading means for reading the signals recorded on the optical disc and for outputting an audible signal in accordance with the thus read signals on the optical disc;

a signal level detecting means for detecting and outputting an audio signal level of the signals recorded on the optical disc and read by said reading means;

a peak level memory means for storing a maximum value of the audio signal level detected by said signal level detecting means;

a peak level position memory means for storing a location on the optical disc of the signals having the value of the audio signal level stored in said peak level memory means;

a comparing means for comparing a value of the audio signal level stored in said peak level memory means and a value of the audio signal level output by said signal level detecting means;

a renewal means for resetting the value stored in said peak level memory means and the location stored in said peak level position memory means when the value of the audio signal level output by said signal level detecting means exceeds the value of the audio signal level stored in said peak level memory means;

a reference value memory means for storing a plurality of preselected reference values;

an operating means for effecting a first search of the optical disc by causing said reading means to sequentially read every N tracks of the optical disc, and for storing in said peak level position memory means a first location on the optical disc in which a maximum value of the audio signal level was detected during said first search, and for effecting a second search of the optical disc by calculating a start-search location and an end-search location based on the first location on the optical disc and reference values stored in said reference value memory means and by causing said reading means to sequentially read every M tracks on the optical disc from the start-search location to the end-search location, and for storing in said peak level position memory means a second location on the optical disc in which a maximum value of the audio signal level was detected during said second search, and for calculating a pause position on the optical disc in accordance with the second location on the optical disc and the reference values stored in said reference value memory means; and, a means for storing said start-search location, said end-search location, and said pause position, wherein N and M are integers and M is less than N.

2. An apparatus as recited in claim 1, wherein said preselected reference values include a first reference value, a second reference value, and a third reference value, and wherein said start-search location is calculated by subtracting said first reference value from said first location, and wherein said end-search location is calculated by adding said second reference value to said first location, and wherein said pause position is calculated by adding said third reference value to said second location.

3. An apparatus as recited in claim 1, further comprising means for causing said reading means to repetitiously read the signals recorded on the optical disc and output an audible signal in accordance with the thus read signals recorded on the optical disc in a vicinity of the pause position.

4. An apparatus as recited in claim 2, further comprising means for causing said reading means to repetitiously read the signals recorded on the optical disc and output an audible signal in accordance with the thus read signals recorded on the optical disc in a vicinity of the pause position.

5. An apparatus as recited in claim 1, further comprising means for causing said reading means to repetitiously read along one track of the optical disc beginning at the pause position and to output a corresponding audible signal.

6. An apparatus as recited in claim 2, further comprising means for causing said reading means to repetitiously read along one track of the optical disc beginning at the pause position and to output a corresponding audible signal.

7. An apparatus as recited in claim 1, further comprising means for repeatedly causing said reading means to output an audible signal for a specified period of time upon detecting a new maximum value of the audio signal level.

8. An apparatus as recited in claim 2, further comprising means for repeatedly causing said reading means to output an audible signal for a specified period of time upon detecting a new maximum value of the audio signal level.

9. In an optical disc reproduction apparatus for audibly reproducing signals recorded on an optical disc, the optical disc having on the surface thereof a plurality of generally concentric recording tracks, the improvement comprising:

a first means for coarsely searching a first region of the optical disc to detect a first location on the optical disc in which a maximum value of a recorded audio signal level is located within the coarsely searched first region;

a determining means for determining a second region of the optical disc, the second region of the optical disc located with the first region of the optical disc and extending in opposite directions from the first location; and, a second means for finely searching the second region on the optical disc to detect a second location on the optical disc in which a maximum value of a recorded audio signal level is located within the finely searched second region.

10. In an optical disc reproduction apparatus as recited in claim 9, the improvement further comprising a repetitious output means for repetitiously outputting audio signals corresponding to the signals recorded on the optical disc in the vicinity of the second location on the optical disc.

11. In an optical disc reproduction apparatus as recited in claim 9, the improvement further comprising:

a means for storing first and second reference values, each of the first and second reference values for denoting a recording distance of the optical disc;

said determining means including means for subtracting the first reference value from the first location to obtain one boundary of the second region, and for adding the second reference value to the first location to obtain another boundary of the second region.

12. In an optical disc reproduction apparatus as recited in claim 10, the improvement further comprising:

a means for storing first and second reference values, each of the first and second reference values for denoting a recording distance of the optical disc;

said determining means including means for subtracting the first reference value from the first location to obtain one boundary of the second region, and for adding the second reference value to the first location to obtain another boundary of the second region.

13. In an optical disc reproduction apparatus as recited in claim 10, the improvement further comprising:

a means for storing a third reference value, the third reference value for denoting a recording distance along a track of the optical disc;

a means for calculating a third location on the optical disc by adding the third reference value to the second location;

said repetitious outputting means including means for repeatedly outputting audio signals corresponding to a track of the third location and beginning at the third location.

14. In an optical disc reproduction apparatus as recited in claim 12, the improvement further comprising:

a means for storing a third reference value, the third reference value for denoting a recording distance along a track of the optical disc;

a means for calculating a third location on the optical disc by adding the third reference value to the second location;

said repetitious outputting means including means for repeatedly outputting audio signals corresponding to a track of the third location and beginning at the third location.

* * * * *